United States Patent
Fernandez-Vicario Herraez et al.

(10) Patent No.: US 11,754,132 B2
(45) Date of Patent: Sep. 12, 2023

(54) SAFETY BRAKE FOR TELESCOPIC MAST OF SEVERAL SEGMENTS

(71) Applicant: GRUPOS ELECTROGENOS EUROPA, S.A.U., Saragossa (ES)

(72) Inventors: Javier Martin Fernandez-Vicario Herraez, Saragossa (ES); Fernando Garcia Castellano, Saragossa (ES)

(73) Assignee: GRUPOS ELECTROGENOS EUROPA, S.A.U., Saragossa (ES)

( * ) Notice: Subject to any disclaimer, the term of this patent is extended or adjusted under 35 U.S.C. 154(b) by 521 days.

(21) Appl. No.: 16/943,484

(22) Filed: Jul. 30, 2020

(65) Prior Publication Data
US 2021/0131510 A1   May 6, 2021

(30) Foreign Application Priority Data
Oct. 31, 2019   (ES) .................................. 201931787

(51) Int. Cl.
| | |
|---|---|
| *F16D 59/00* | (2006.01) |
| *E04H 12/18* | (2006.01) |
| *B65H 75/30* | (2006.01) |
| *F21Y 115/10* | (2016.01) |
| *F21V 21/22* | (2006.01) |
| *F16D 121/14* | (2012.01) |

(52) U.S. Cl.
CPC ............. *F16D 59/00* (2013.01); *B65H 75/30* (2013.01); *E04H 12/182* (2013.01); *B65H 2513/20* (2013.01); *F16D 2121/14* (2013.01); *F21V 21/22* (2013.01); *F21Y 2115/10* (2016.08)

(58) Field of Classification Search
CPC ...... F16D 59/00; F16D 2121/14; F21V 21/22; B65H 75/30; B65H 2513/20; E04H 12/182; F21Y 2115/10
See application file for complete search history.

(56) References Cited

U.S. PATENT DOCUMENTS 2,795,303 A * 6/1957 Muehlhause ......... E04H 12/182
                                                            52/646
9,312,596 B2 * 4/2016 Newman ................ H01Q 1/246
(Continued)

FOREIGN PATENT DOCUMENTS

CN    202746979 U    2/2013
CN    212475929 U *  2/2021
(Continued)

*Primary Examiner* — Sang K Kim
(74) *Attorney, Agent, or Firm* — Notaro, Michalos & Zaccaria P.C.

(57) ABSTRACT

Safety brake for multi-segment telescopic mast of the type used in masts of lighting, surveillance or communication towers, having at least one retractable reel fixed jointly on the top of an external segment of the telescopic mast of the lighting, surveillance or communication tower, in which a tape, or rope is wound, terminated by its free end in a fixing piece, fixed jointly on the inner lower part of an internal segment of the telescopic mast, passing the tape, or rope in the gap between both segments, providing the retractable reel for winding and unwinding the belt, or rope, having to detect an acceleration greater than a preset in the removal of the tape, or rope, and having to block the tape, or rope in case of acceleration greater than a preset in the removal of the tape, or rope.

9 Claims, 6 Drawing Sheets

(56) References Cited

U.S. PATENT DOCUMENTS

| | | | |
|---|---|---|---|
| 9,561,942 B2* | 2/2017 | Busuttil | B66F 9/087 |
| 2005/0162544 A1* | 7/2005 | Wong | H04N 23/66 |
| | | | 348/E7.086 |
| 2019/0249446 A1* | 8/2019 | Partain | E04F 21/1811 |
| 2020/0283274 A1* | 9/2020 | Honjo | B66D 1/225 |

FOREIGN PATENT DOCUMENTS

| | | | | |
|---|---|---|---|---|
| ES | 145552 U | 5/1969 | | |
| ES | 166981 U | 7/1971 | | |
| ES | 2630766 A1 | 8/2017 | | |
| ES | 1211939 U | 5/2018 | | |
| JP | 2020142876 A | * | 9/2020 | B66C 13/20 |

* cited by examiner

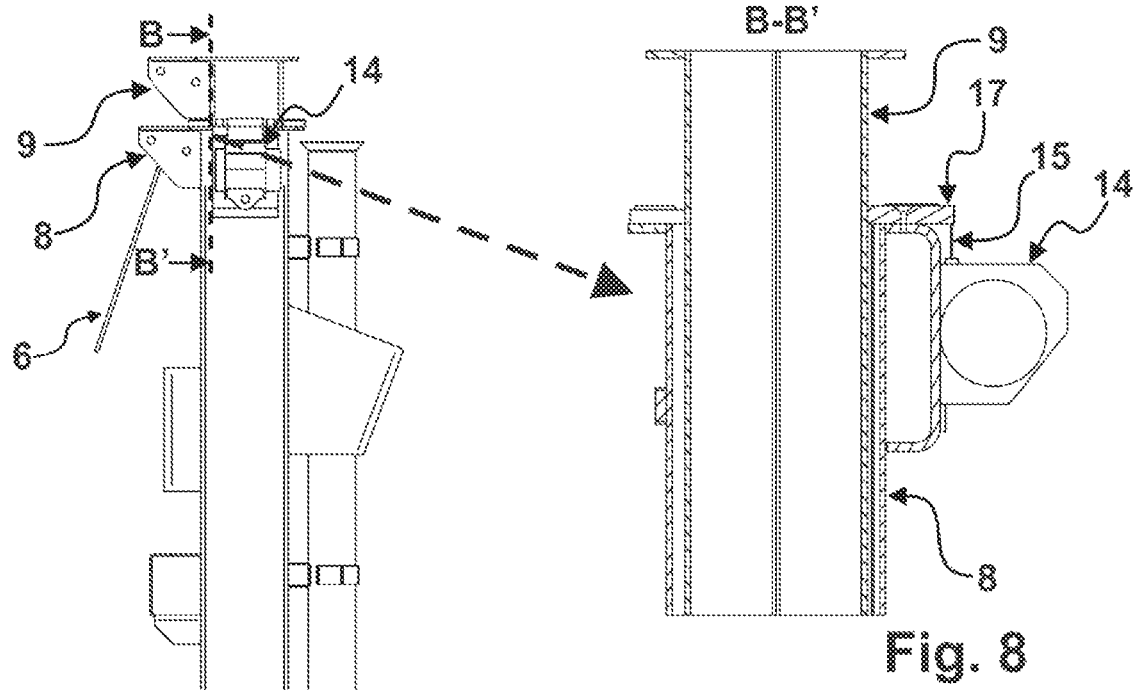
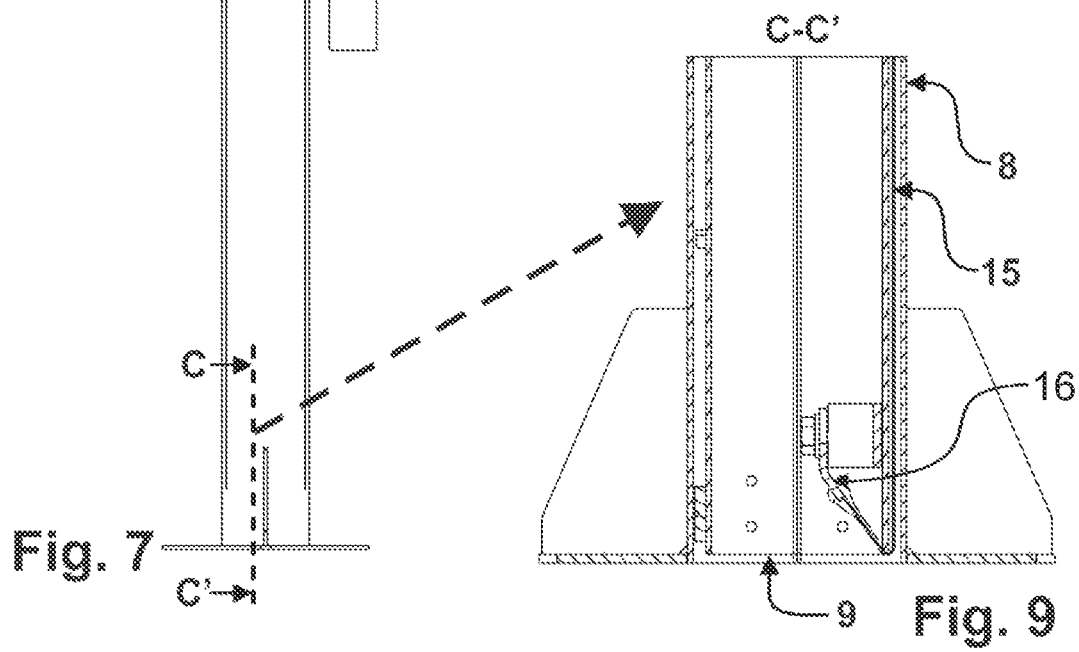

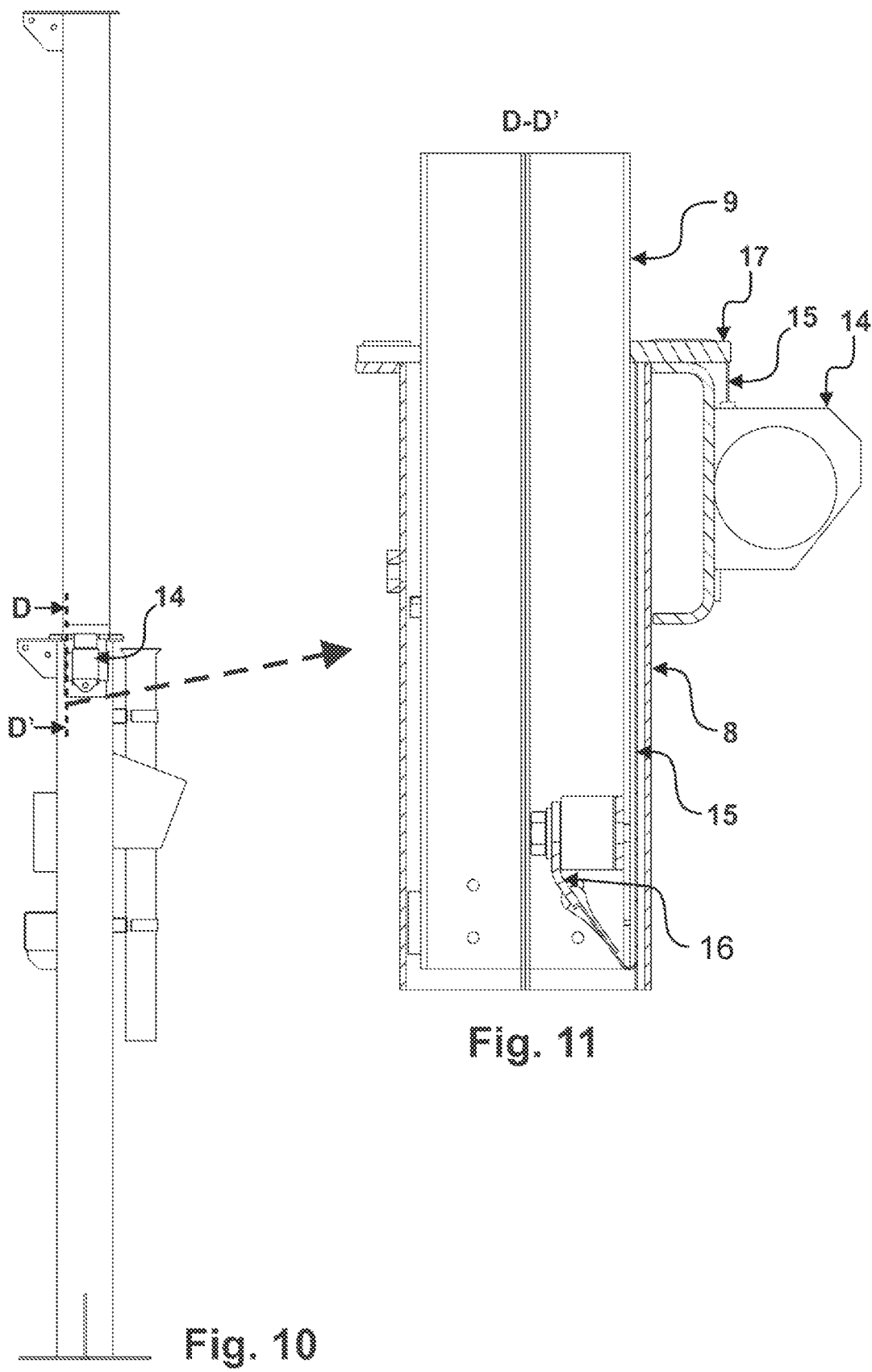

SAFETY BRAKE FOR TELESCOPIC MAST OF SEVERAL SEGMENTS

FIELD AND BACKGROUND OF THE INVENTION

Field of the Invention

This description relates, as its title indicates, to a safety brake for a tower mast formed by several telescopic segments used normally for light, surveillance or communication, which prevents the total or partial collapse of the mast due to its malfunction, by means of one or several retractable reels, on which is wound a belt, cable or rope, finished at its free end in a securing piece. The retractable reel has means for winding and unwinding the said belt, cable or rope inside it and has means for detecting a higher acceleration in the extraction of the belt, cable or rope than that preset, as well as having means for blocking and stopping the unwinding of the belt, cable or rope in such a case.

The invention relates to the field of light, surveillance or communication towers, in particular, those that have a telescopic mast and are linked to a generator set, batteries or any other power generation source.

Background of the Invention

Currently the need for lighting or additional lighting has led to the widespread use of stand-alone light towers in many settings, from construction sites to public events. Given the functionality of these devices, most of them consist of a mast of a greater or lesser length, typically telescopic, which is deployed to position the floodlight as high as possible and in this way illuminate a larger area. Examples of such towers can be found in patents ES-2630766 "Device and procedure of monitoring and control in telescopic towers" and CN202746979 Remotely-controlled movable hydraulic hoisting illumination lamp tower".

Safe use of a telescopic light, surveillance or communication tower requires guaranteeing operating safety in all conditions of use of the tower. However, in spite of ensuring a good design of the telescopic tower, operating safety may be jeopardised by the conditions in which the tower is installed, the conditions in which the mast is deployed and other factors external to the installation of the base itself.

Some of these factors relating to the installation and use of the telescopic tower directly affect the safety of the equipment. Among these direct factors the following can be highlighted:

Mechanical factors of the different parts of a telescopic light tower:
  Level of extension of the mast
  Orientation of the floodlights which determine the effective surface area facing the wind in specific working conditions.
  Deterioration of the quality or strength of the structural elements of the tower.
Site constraints:
  Characteristics of the terrain, such as ground strength and others
  Slope or gradient of the terrain.
  Presence of objects or obstacles that affect mast extension However, other external factors may indirectly affect structural safety and/or cause the structure to tip over when the tower is in use. Among these factors the following can be highlighted:

Ambient factors, wind, rain, ice.
Conditions of use and handling of the tower, impacts, blows, etc.
The surface area facing the wind.

An important characteristic for light, surveillance or communication towers is operation reliability, for this reason each of the elements that form the mast are dimensioned to withstand the forces exerted during normal operation of the tower. Due to misuse or poor maintenance some components can suffer wear and tear, which can cause accidents. Specifically, the elements that suffer most wear and tear are the elements that drive the telescopic movement, in particular, steel cables and pulleys. Incorrect functioning or excessive wear of these elements may cause the breakage of one of the cables, in which case the telescopic mast would collapse and, as a result, the light, surveillance or communication devices would fall at an uncontrolled speed, which represents a danger that could cause a serious accident if an operator is near to the light, surveillance or communication tower, either during its operation or when performing other types of work in the area around the said tower.

Manufacturers have come up with ideas that mainly consist of using mechanical blocking means, such as pins or bolts, both manual and automatic, between the different segments that form the tower, as described in patent ES1211939 "Load lifting tower with a safety system", but these blocking systems only secure the tower once it is lifted, but not during the lifting process, which is the most dangerous phase since during it the stability of the unit depends solely on the cable or cables that lift it.

Furthermore use of self-braking winches is common, as can be found in patents ES0145552 "A winch" and ES0166981 "Safety device that acts on a lifting cable in which a winch is raised", but these devices only ensure against a failure of the winch operator or a motor breakdown, and never protect against the breakage of the lifting cable.

Advantages of the Invention

The safety brake for telescopic mast of several segments of light, surveillance or communication towers presented herein, affords numerous advantages over the devices currently available, the most important of these being that it prevents the total or partial collapse of the mast due to a malfunction of the latter.

Another important advantage is that it guarantees greater safety for the operator during the use of the light, surveillance or communication tower, while the mast is totally or partially deployed.

A further advantage of this invention is that the safety device enables the telescopic movement between the first mast element and second mast element to be blocked when the system descends at an uncontrolled speed, due, for example to a breakage of the cable.

Another of the most important advantages worth mentioning is that, in the event of a malfunction of the lifting device of the mast that involves the sudden collapse of the telescopic mast, the preceding telescopic movement is blocked, this way preventing the light, surveillance or communication system from causing injury or damage to the people or goods located near to the light, surveillance or communication tower.

In addition, a further advantage is that this safety brake is easily and quickly adaptable to existing telescopic light, surveillance or communication tower equipment of any make and origin.

BRIEF DESCRIPTION OF THE DRAWINGS

To gain a better understanding of the present invention the attached drawing shows a preferred practical embodiment of a safety brake for a telescopic mast of several segments of light, surveillance or communication towers.

FIG. 7 shows a side view of two of the segments of the telescopic mast of the light tower in a retracted position.

FIG. 8 shows a front view of the detailed cutaway according to section B-B' of two of the segments of the telescopic mast of the light tower, in a retracted position, showing the safety brake.

FIG. 9 shows a front view of the detailed cutaway according to section C-C' of two of the segments of the telescopic mast of the light tower, in a retracted position.

FIG. 10 shows a side view of two of the segments of the telescopic mast of the light tower in a deployed position.

FIG. 11 shows a front view of the detailed cutaway according to section D-D' of two of the segments of the telescopic mast of the light tower, in a deployed position, showing the safety brake.

DETAILED DESCRIPTION OF THE INVENTION

Figure 1:
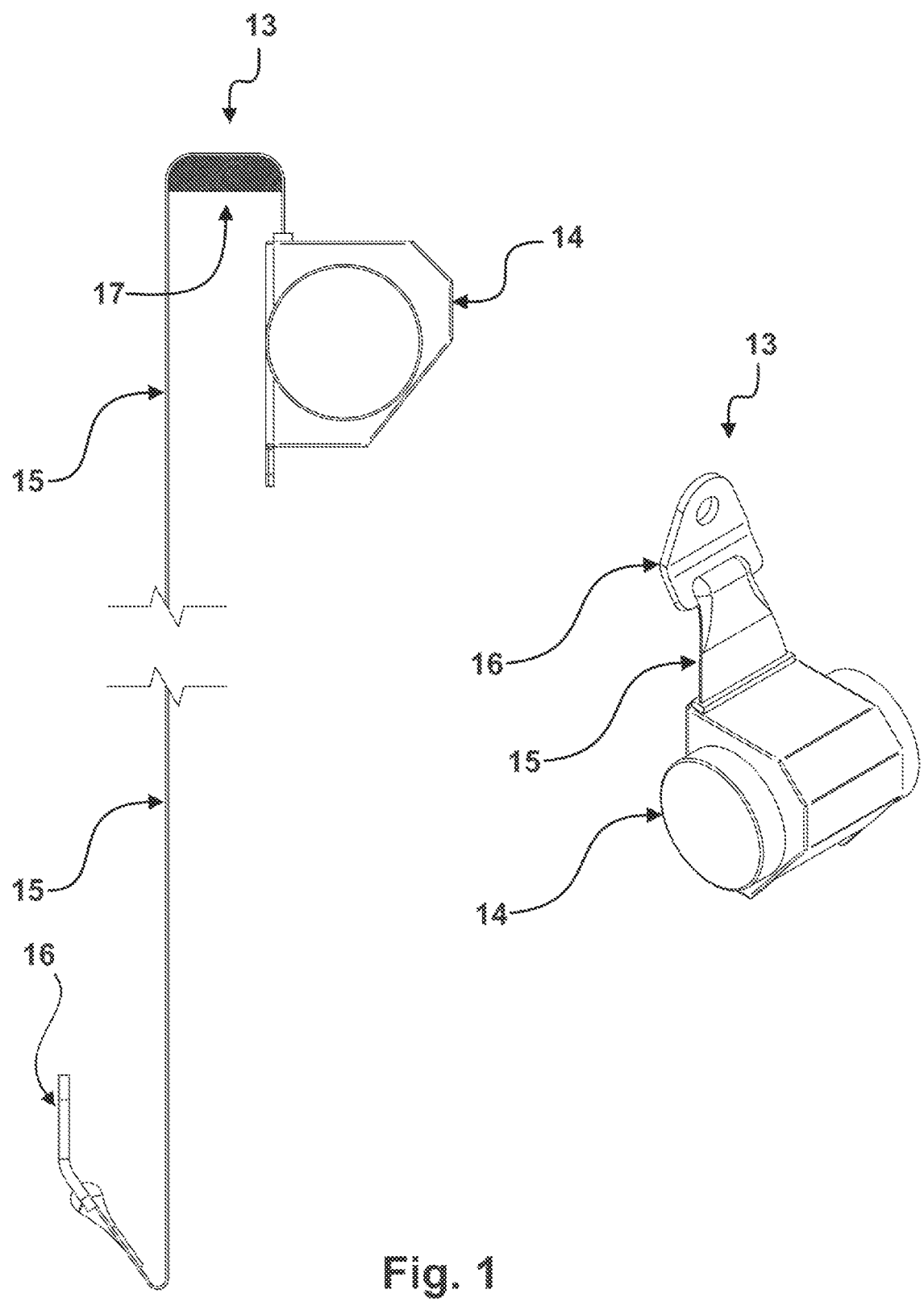
FIG. 1 shows the safety brake device, unwound in a side view unwound, and wound in a perspective view.

To overcome the problem currently existing in relation to safety in the use of light, surveillance or communication towers, by improving the state of the art, the safety brake for a telescopic mast of several segments of light, surveillance or communication towers, which is the object of the invention presented herein, has been devised, which is a device that can be coupled to a telescopic mast and can be mounted on a light, surveillance or communication tower, which prevents the total or partial collapse of the mast due to a malfunction of the latter. This guarantees greater operator safety during the use of the light, surveillance or communication tower while the mast is totally or partially deployed. This device comprises one or several retractable reels; wound on the reel is a belt, cable or rope, finished at its free end in a securing piece. The retractable reel has means for winding and unwinding the said belt, cable or rope inside it, and has means for detecting a higher acceleration in the extraction of the belt, cable or rope than that preset, as well as having means for blocking and stopping the unwinding of the belt, cable or rope in such a case.

The retractable reel or reels are firmly attached on the upper part of the external segment of the mast of the light, surveillance or communication tower and the securing piece is attached on the lower internal part of the internal segment of the mast, between which the safety system is going to be installed, the external and internal segments being telescopically linked, and the belt, cable or rope passing through the gap between both segments. The belt, cable or rope is guided through at least one guide piece that prevents the said belt, cable or rope from becoming misaligned with the telescopic movement that occurs between the two segments of the mast.

Thus, if there is a breakage in the rope or a sudden collapse of the mast due to misuse or an oversight in the operating of the light, surveillance or communication tower, this safety brake detains the fall of the mast segments on which it is installed and prevents the total or partial collapse of the telescopic mast. Hence, in the event of a malfunction of the lifting system that involves the sudden collapse of the telescopic mast, the preceding telescopic movement is blocked, this way preventing the light, surveillance or communication system from causing injury or damage to the people or goods located near to the light, surveillance or communication tower.

The safety brake, linked between a first mast element, preferably more external and adjacent to a second mast segment, and that are telescopically linked, without excluding connection between other mast segments, enables the telescopic movement to be blocked in the event that a given acceleration is detected.

The conformation and characteristics of the invention can be better understood in the following description that relates to the attached figures, beginning with a general description of a light, surveillance or communication tower (1).

In FIGS. 1, 7, 8, 9, and 10 it can be seen that the safety brake for telescopic mast of several segments, of the type used in masts of light, surveillance or communication towers (1), comprises at least one retractable reel (14) on which is wound a belt, cable or rope (15), finished at its free end in a securing piece (16), the retractable reel (14) having means for winding and unwinding the said belt, cable or rope (15), having means for detecting a higher acceleration in the extraction of the belt, cable or rope (15) than that preset, and having means for blocking and stopping the unwinding the belt, cable or rope (15) in the event of a higher acceleration in the extraction of the belt, cable or rope (15) than that preset.

The means for detecting a higher acceleration in the extraction of the belt, cable or rope (15) than that preset may comprise an inertial accelerometer. The means for blocking the belt, cable or rope (15) in the event of an acceleration in the extraction of the belt, cable or rope (15) that is higher that a preset one, may comprise an inertia brake.

Preferably a brake device such as that described will be implemented on each tower (1). It is envisaged that if required, protection can be backed up by incorporating several brakes per pair of mast segments.

The light tower (1) normally consists of a base (2), a telescopic mast (3) made up of a plurality of concentric segments, and a lighting device (4). The said telescopic mast (3) is anchored to the base (2) by means of the segment located on the lower part of the telescopic mast (3), commonly the most external one and at the top of this telescopic mast is the lighting device (4). This lighting device (4) can be formed by one or more lighting sources. In the case shown as an example in FIG. 2, the lighting device (4) consists of 4 LED floodlights, although alternatively a different number of floodlights, both LED, adjustable or not, and metal halide or halogen, can be used. If the tower (1) is a surveillance or communication tower, several cameras or aerials can be fitted at the same time.

As can be seen in FIGS. 8, 9 and 11, the retractable reel (14) is firmly attached on the upper external part of an external segment (8) of the telescopic mast (3) of the light, surveillance or communication tower (1) and the securing piece (16) is attached on the lower internal part of an internal segment (9) of the telescopic mast (3), between which the safety system is going to be installed, the external segment (8) and the internal segment (9) being telescopically linked and the belt, cable or rope (15) passing through the gap between both segments. The belt, cable or rope (15) is guided through at least one guide piece (17) that prevents the said belt, cable or rope (15) from becoming misaligned with the telescopic movement that occurs between both segments of the mast. This guide piece (17) for the belt, cable or rope (15) can be static or dynamic with circular movement, such as for example a pulley.

The external segment (8) and internal segment (9) can be any of those that form the telescopic mast (3), provided that one is always internal to the other inside the telescopic mechanism. In a preferred embodiment the external segment (8) is the lower segment, once deployed, of the telescopic mast (3) and the internal segment (9) is the one following the external segment (8). In an alternative embodiment the external segment (8) is the lower segment, once deployed, of the telescopic mast (3), and the internal segment (9) is the upper segment, once deployed, of the telescopic mast (3).

Thus, if there is a breakage of the rope (6) or a sudden collapse of the mast due to misuse or an oversight in the operating of the light tower, this safety brake (13) detains the fall of the mast segments on which it is installed and prevents the total or partial collapse of the telescopic mast (3). The safety brake (13) allows the telescopic movement to be blocked if a given acceleration is detected.

Figure 2:
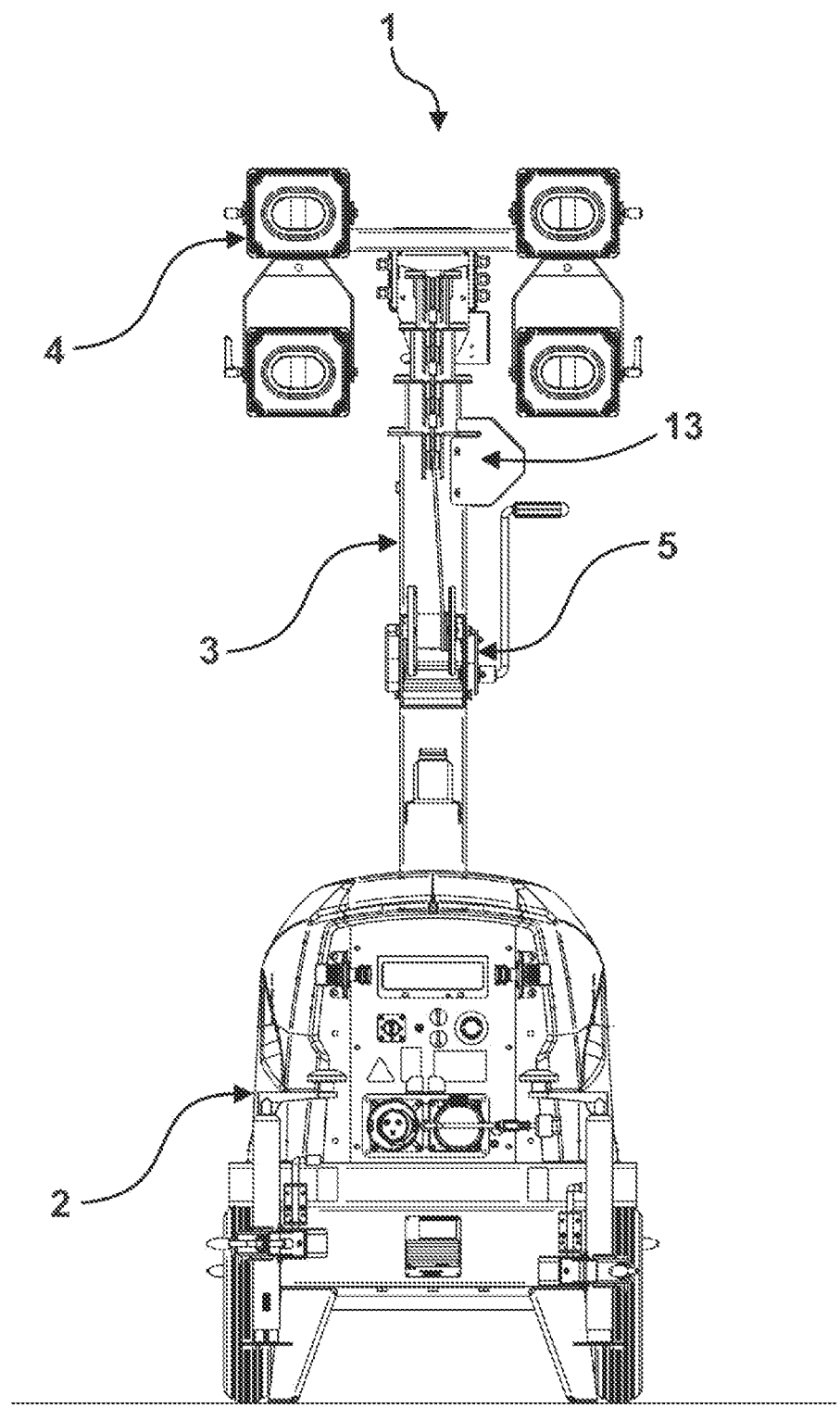
FIG. 2 shows a front view of a light tower according to this invention, in a retracted position.

FIG. 2 shows an illustration of an example of a light, surveillance or communication tower (1) according to the present invention, in a retracted position. This illustration does not limit the possibility of other light tower and/or mast configurations.

Figures 3, 4:
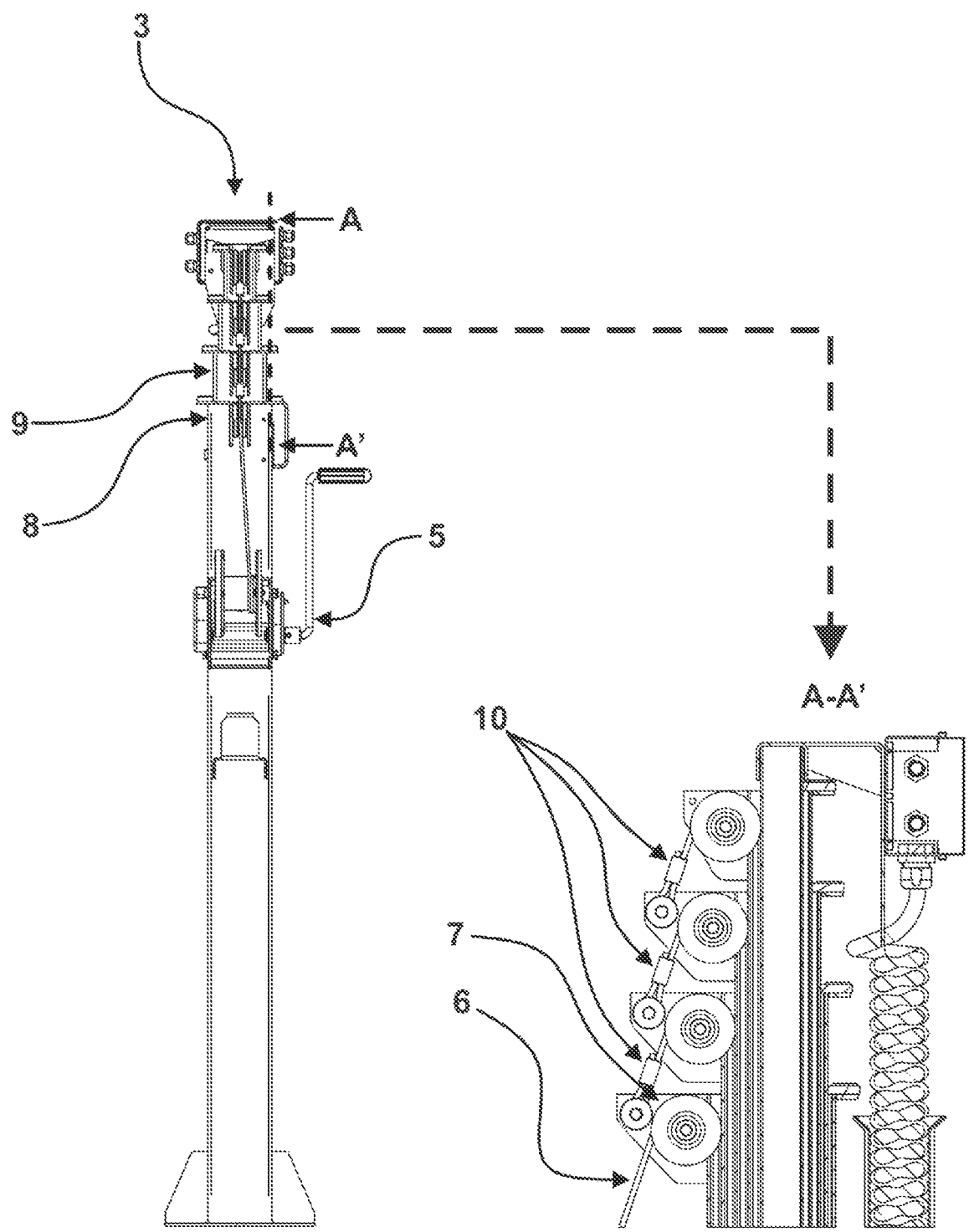
FIG. 3 shows a front view of the telescopic mast of the light tower, in isolation, to be able to observe the details described in this invention more clearly.
FIG. 4 shows a side view of the cutaway according to the A-A' section of the telescopic mast of the light tower.

FIGS. 3 and 4 show the telescopic mast (3) of the light, surveillance or communication tower (1). This telescopic mast (3) consists of a lifting device consisting of a winch (5), in this case manual, although it could be replaced by similar devices such as, for example, electric winches or hydraulic systems, attached to the first mast element (8); at least one rope (6), normally steel, and at least one pulley (7). The illustration shows a mast consisting of 4 ropes and 4 pulleys, however, to facilitate the understanding of the safety brake, its application will be shown only on the first two segments (8) and (9) of the mast, although this safety brake is applicable to any two segments of the mast linked together telescopically. It is envisaged that the safety brake can be installed between any segment of the telescopic mast (3) on which the retractable reel (14) is fitted, and its immediate interior, in telescopic order, on which the securing piece (16) is fitted.

The winch (5) acts on the first of the ropes (6) which is linked, by means of the pulley (7), to the lower and internal part of the second mast segment (9), which is immediately interior to the first mast segment (8), both belonging to the telescopic mast (3) unit.

By means of the action of the winch (5), the rope (6) is tightened, causing the ascent of the second mast segment (9) in regard to the first mast segment (8), in a telescopic movement. By means of the rest of the ropes (10), the rest of the mast segments elevate at the same time as the first mast element on which the winch (5) acts, in a telescopic movement until the required height is reached. To operate the winch (5) it is usually necessary for an operator to manually operate it in the vicinity of the light, surveillance or communication tower (1), although there are also automatic and telematic procedures.

Both the ropes (6) and pulleys (7), and the rest of the ropes and pulleys of the machine, are designed and dimensioned to withstand, except in the case of abnormal functioning, the tensions that occur in the mast segments during their operation. During lifting of the telescopic mast these ropes and pulleys undergo greater stress than during normal operation of the light, surveillance or communication tower (1), making this phase quite critical due to the presence of at least one operator near to the base (2) of the light, surveillance or communication tower (1)

Figure 5:
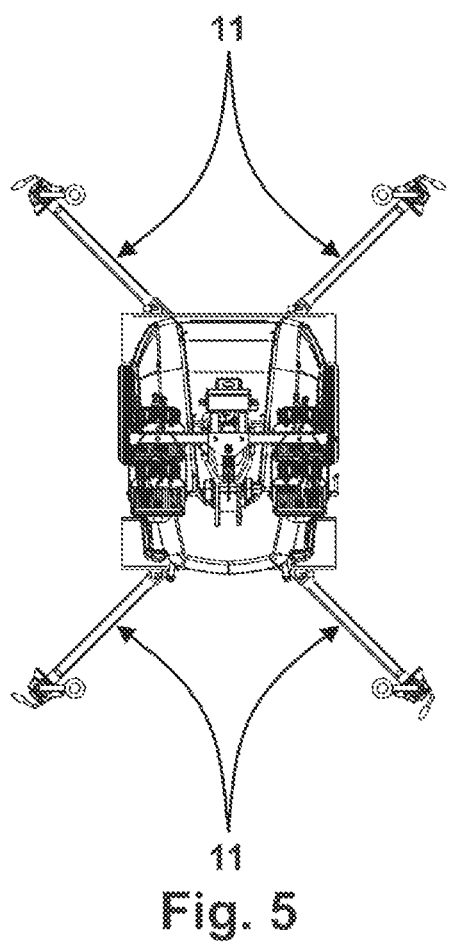
FIG. 5 shows a plan view of the light tower in a deployed position.
Figure 6:
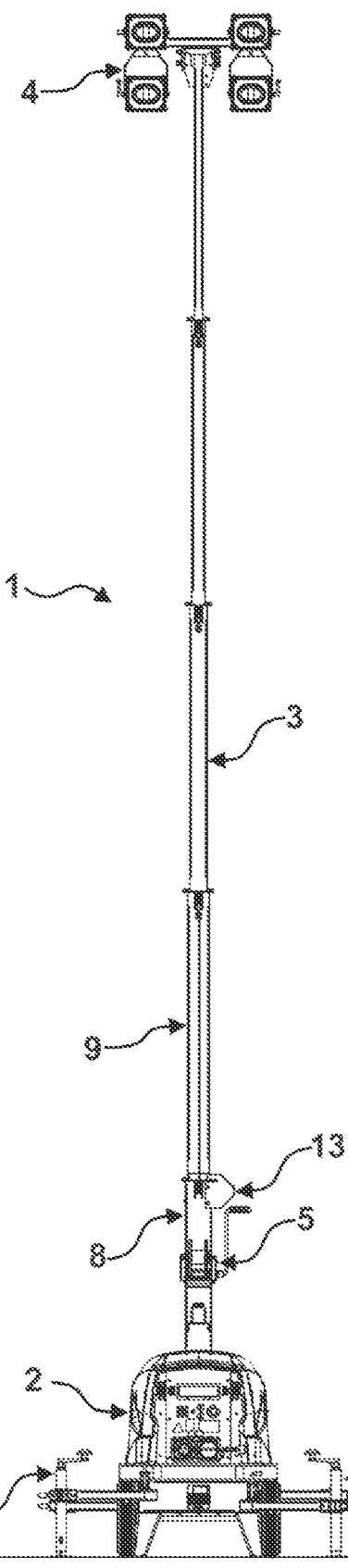
FIG. 6 shows a front view of the light tower in a deployed position.

FIGS. 5 and 6 show the tower in its fully deployed position. For greater safety and stability, the base (2) is supported preferably by stabilisers (11), the number of which can vary depending on the need to increase the area on which the tower is supported, the said stabilisers allowing the tower to be levelled even on uneven terrain. Frequently, the base (2) includes auxiliary systems for transportation, such as housings for lifting using forklifts or similar, lifting eyes or housings for lifting and wheels. Furthermore, preferably the base (2) has electrical connections that enable the lighting system (4) to light up. The said connections may be formed by a generator, batteries, external power supply connections, etc. The electrical connection between the base (2) and the lighting system 1.3 normally consists of a coiled cable that can stretch and contract depending on the height of the lighting system (4), but it can also be, including a wide variety of options, an internal mast cable or a cable that winds up with a reel. In addition, the base (2) comprises all of the devices required for the operation of the telescopic mast and other elements that the operator is not always aware of or does not know it has.

FIGS. 7, 8, and 9 show a cutaway of the upper and lower part of two segments of the telescopic mast (3) in its retracted position, showing an example of the installation of the safety brake (13), with the protective housing removed for a better view, between the mast segment (8) and the mast segment (9), which are linked together telescopically.

FIGS. 9 and 11 show the cutaway of the upper and lower part of two segments of the telescopic mast (3) in its deployed position, showing an example of the installation of the safety system, with its protective housing eliminated for a better view, between the internal segment (9) of the telescopic mast (3) and the external segment (8) of the telescopic mast, which are linked together telescopically.

This example of the installation of the safety brake (13) that is shown in the figures has been installed between the first two elements of the telescopic mast (3), which prevents the collapse of the first moving segment (9) of the telescopic mast. This situation is the most restrictive since this first cable is that which supports most tension in the unit and thus is the one most exposed to breakage. Moreover, in the event of other mast cables breaking, the collapse would be partial, which would not entail as much risk for the operator in the event of a collapse of the mast. Obviously, it is possible to install this device between any of the segments of the telescopic mast (3).

A person skilled in the art will easily comprehend that the characteristics of different embodiments can be combined with the characteristics of other possible embodiments, provided that the combination is technically possible.

All the information referring to examples or embodiments form part of the description of the invention.

The invention claimed is:

1. A safety brake for telescopic mast of several segments, of the type used in masts of light, surveillance or communication towers, characterised in that it comprises at least one retractable reel (14), firmly attached on the upper part of an external segment (8) of the telescopic mast (3) of the light, surveillance or communication tower (1), on which is wound a belt, cable or rope (15), finished at its free end in a securing piece (16), firmly attached on the lower internal part of an internal segment (9) of the telescopic mast (3), the belt, cable or rope (15) passing through the gap between both segments, the retractable reel (14) having means for winding and unwinding the said belt, cable or rope (15), having means for detecting an acceleration in the extraction of the belt, cable or rope (15) higher than that preset, and having means for blocking the belt, cable or rope (15) in the event that the acceleration detected in the extraction of the belt, cable or rope (15) is higher than that preset.

2. The safety brake for telescopic mast of several segments, according to claim 1, wherein the external segment (8) is the lower segment, once deployed, of the telescopic mast (3), and the internal segment (9) telescopes out of the external segment (8).

3. The safety brake for telescopic mast of several segments, according to claim 1, wherein the external segment (8) is the lower segment, once deployed, of the telescopic mast (3), and the internal segment (9) is the upper segment, once deployed, of the telescopic mast (3).

4. The safety brake for telescopic mast of several segments, according to claim 1, wherein the belt, cable or rope (15) is guided through at least one guide piece (17).

5. The safety brake for telescopic mast of several segments, according to claim 4, wherein the guide piece (17) for the belt, cable or rope (15) is static.

6. The safety brake for telescopic mast of several segments, according to claim 4, wherein the guide piece (17) for the belt, cable or rope (15) is a pulley or roller.

7. The safety brake for telescopic mast of several segments, according to claim 1, wherein the means for detecting a higher acceleration in the extraction of the belt, cable or rope (15) than that preset, comprises an inertial accelerometer.

8. The safety brake for telescopic mast of several segments, according to claim 1, wherein the means for blocking the belt, cable or rope (15) in the event of a higher acceleration in the extraction of the belt, cable or rope (15) than that preset, comprises an inertia brake.

9. The safety brake for telescopic mast of several segments, according to claim 1, wherein the brake can be mounted on any of the segments of the telescopic mast (3), on which the retractable reel (14) is fitted, and its immediate interior, in telescopic order, on which the securing piece (16) is fitted.

* * * * *